United States Patent
Rossignol et al.

(10) Patent No.: US 12,378,452 B2
(45) Date of Patent: Aug. 5, 2025

(54) LATENT EPOXY-AMINE COMPOSITION FOR CIPP APPLICATION

(71) Applicant: SIKA TECHNOLOGY AG, Baar (CH)

(72) Inventors: Jean-Louis Rossignol, Jouy le moutier (FR); Arnaud Zuretti, Cergy (FR); Fleur Chaignon-Lesetre, Serifontaine (FR); Anthony Grohar, Clichy (FR)

(73) Assignee: SIKA TECHNOLOGY AG, Baar (CH)

( * ) Notice: Subject to any disclaimer, the term of this patent is extended or adjusted under 35 U.S.C. 154(b) by 510 days.

(21) Appl. No.: 17/634,786

(22) PCT Filed: Aug. 31, 2020

(86) PCT No.: PCT/EP2020/074253
§ 371 (c)(1),
(2) Date: Feb. 11, 2022

(87) PCT Pub. No.: WO2021/043728
PCT Pub. Date: Mar. 11, 2021

(65) Prior Publication Data
US 2022/0332992 A1    Oct. 20, 2022

(30) Foreign Application Priority Data
Sep. 2, 2019   (EP) ..................... 19194938

(51) Int. Cl.
   *C09J 163/04*   (2006.01)
   *C09J 7/25*   (2018.01)
(52) U.S. Cl.
   CPC .............. *C09J 163/04* (2013.01); *C09J 7/255* (2018.01); *C09J 2203/346* (2020.08); *C09J 2400/163* (2013.01)
(58) Field of Classification Search
   None
   See application file for complete search history.

(56) References Cited

U.S. PATENT DOCUMENTS

| | | | |
|---|---|---|---|
| 9,651,189 B2 | 5/2017 | Karunakaran et al. | |
| 2014/0107255 A1 | 4/2014 | Wittenbecher et al. | |
| 2016/0017087 A1 | 1/2016 | Lal et al. | |
| 2019/0100616 A1* | 4/2019 | Zhou .................. | C08G 59/5006 |

FOREIGN PATENT DOCUMENTS

| | | |
|---|---|---|
| WO | 2013/009452 A1 | 1/2013 |
| WO | 2018/074998 A1 | 4/2018 |

* cited by examiner

*Primary Examiner* — Michael N Orlando
*Assistant Examiner* — Abhishek A Patwardhan
(74) *Attorney, Agent, or Firm* — Oliff PLC

(57) ABSTRACT

A two-component epoxy resin composition, made of: a resin component including: at least one epoxy resin that contains on average more than one epoxy group per molecule; up to 25 wt.-% of at least one epoxy-functional reactive diluent having one or two epoxy groups per molecule; and a hardener component including: between 40 and 80 wt.-% of at least one amino-functional hardener of formula (I),

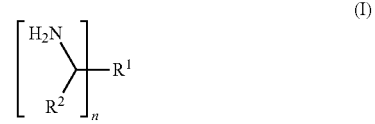

wherein n is an integer with a value of 2 or 3, $R^1$ is a linear, cyclic or branched alkyl residue that optionally contains ether oxygen atoms and $R^2$ is a methyl or ethyl group; between 10 and 30 wt.-% of at least one Lewis base having at least one tertiary amino group, amidine group, or guanidine group; and between 10 and 30 wt.-% of at least one carboxylic acid.

16 Claims, No Drawings

LATENT EPOXY-AMINE COMPOSITION FOR CIPP APPLICATION

TECHNICAL FIELD

The present invention relates to the field of two-component epoxy resin compositions, in particular suitable resins for cured-in-place pipe (CIPP) processes, as well as a process for relining a pipe involving CIPP technology.

PRIOR ART

Pipes in domestic or industrial applications, such as underground sewer pipes, potable water pipes, and other domestic or industrial pipe systems commonly show signs of age and damages after prolonged use, such as leaks, fractures and other deteriorations. Repair of these leaking and damaged pipes is time consuming and expensive as it normally involves excavation and replacement of these damaged pipes, which leads to traffic hindrances, industrial downtimes, and long, expensive repair procedures.

In the 1970s, a new, dramatically improved process for repairing such damaged pipes was developed mainly in the United Kingdom and the United States, and later improved and widely applied worldwide. The so-called cured-in-place pipe (CIPP) technology revolutionized the sewer pipeline repair industry, providing a reliable solution to rehabilitating sewer pipelines without the need to excavate the old pipe system. The principle of CIPP is to use a felt liner impregnated with a curable resin that is placed within the pipe to be repaired and subsequently the resin is cured to form a new, intact inner surface of the pipe, without the need of excavating or replacing the old pipe.

There are two commonly used processes for cured-in-place pipe applications. First, the so-called "inversion installation method" and second, the so-called "pull-in installation method". The most common is the "inversion installation method" and the process involves impregnating a flexible non-woven felt liner with the curable thermoset composition, followed by inverting the impregnated non-woven felt liner into an existing (host) pipe, and curing of the impregnated felt liner within the host pipe. The CIPP process is classified as rehabilitation or renovation process because it forms a new hard inner pipe within and adhering to the existing host pipe.

There are basically three types of thermoset resin systems commonly used for this application: Polyester resins, commonly used in sewer applications, vinyl ester resins, used in severe duty, industrial and special waste applications, and epoxy-amine resins, commonly used in potable water and pressure pipe applications.

The traditional polyester system remains the lower cost workhorse of the industry, however having significant drawbacks that are also common with vinyl ester resins. They are commonly not very stable in contact with water and show poor adhesion on the host pipe. Furthermore, high shrinkage during the curing step is often observed. Curing of these resins is often done by UV or LED irradiation, which requires special equipment and is not always applicable, for example when the pipes are not everywhere accessible due to, for example, sharp turns.

An improved process was established using heat-curable epoxy-amine resins. These can be cured by heat, also by hot water or steam, and show a much better adhesion performance than the other resin chemistries. Although epoxy resins have been used to protect and repair all types of infrastructure for the past 75 years, their use in underground pipe rehabilitation was limited due to handling constraints (a relatively short pot-life) and high cost. Although epoxy-amine thermoset systems are superior to polyesters and vinyl esters for properties like shrinkage, adhesion, no presence of solvents like styrene, low odor, mechanical properties, and chemical resistance, their main draw-back is the shorter pot-life which makes it difficult to work in CIPP applications. In particular, the impregnated felt liners have to be impregnated directly on the job site since even at low temperatures of <15° C. the impregnation is not storable longer than approximately 5 to 12 h before the irreversible hardening or curing is advanced too much for the application. This leads to complicated, long processes directly at the job site because the impregnation step has to be performed directly before the actual CIPP process is initiated. Furthermore, it is undesirable to mix and apply resin chemicals on repair sites such as public roads.

Epoxy-amine thermoset resins have therefore in the past been generally reserved for limited use in high end applications like aggressive municipal and industrial wastewater applications.

Pot-life is a measure of the working time in minutes or hours during which the felt liner in a cured-in-place application can be impregnated with a thermoset resin system, inverted, and cured properly in the host pipe. A useful pot-life for a successful CIPP application is at least greater than 5 hours, preferably more. Polyesters and vinyl ester thermosets can manage this pot-life. Epoxy-amine thermosets can barely meet this requirement as their pot-life commonly ranges from 30 minutes to barely 5 hours and sometimes up to 12 hours under special conditions such as keeping it at a cooler temperature, e.g. 5 to 15° C. Therefore, an epoxy thermoset system with a longer pot-life would be useful and desired for CIPP applications.

There have been attempts to improve the pot-life of epoxy resins in CIPP applications. For example, WO 2013/009452 A1 and U.S. Pat. No. 9,651,189 B1 disclose an improved epoxy-resin CIPP process using an epoxy-anhydride thermoset composition with a pot-life of up to 24 h.

WO 2018/074998 A1, as another example, discloses a delayed cure single component resin composition with long pot-life suitable for CIPP applications comprising cyclic anhydride in the composition and an activator pre-blend.

However, anhydride based epoxies often have decreased adhesion on wet surfaces, which limits the application in CIPP processes significantly.

Other approaches use slow-curing amine hardeners such as aromatic amines, e.g. diethyltoluenediamine (DETDA) that allow for long pot-life of >12 h, but these compositions on the other hand require long, harsh curing conditions such as extremely high temperatures, which is often not feasible or viable in CIPP processes.

There is therefore still a need for an epoxy-amine resin composition suitable for CIPP processes that does not have the disadvantages of epoxy-anhydride systems in terms of adhesion difficulties, but still has an improved pot-life such that the impregnated liner felts can be stored up to 1 week before application in the CIPP process and/or the felt liners can be impregnated off-site and stored and transported at a later stage. It would be desirable to be able to impregnate the liner for example in a workshop instead of on the actual job site by the CIPP applicators in order to improve impregnation quality (better traceability, reproducibility), flexibility, costs (manpower overtime) and security.

Furthermore it would be desirable to obtain such an epoxy-based thermoset that, despite its long pot-life and storage stability in the mixed an applied state, can be cured during the CIPP process within short time at a moderate temperature, e.g. 60-100° C., using steam or hot water.

DISCLOSURE OF THE INVENTION

Accordingly, it is the object of the present invention to provide a two-component epoxy resin composition with a long duration storage time of up to one week at between −5° C. and 15° C. in the mixed state, a sufficiently low viscosity right after mixing for an easy felt material impregnation, a sufficiently high viscosity when the CIPP application of the impregnated felt is performed such that no sagging occurs within the pipe, and a short curing process within less than a few hours at between 60 and 100° C. using hot water, hot air, or steam in accordance with the technical requirements for CIPP processes as specified in ISO 11296-4 and ASTM D 5813.

Surprisingly, it was found that by using a two-component epoxy resin composition comprising in the hardener component between 40 and 80 wt.-% of amine hardeners with primary amino groups attached to branched hydrocarbon residues, between 10 and 30 wt.-% of a Lewis acid having at least one tertiary amino group, amidine group, or guanidine group, and between 10 and 30 wt.-% of at least one carboxylic acid, the above object can be achieved.

The thus established Lewis salt in combination with low reactivity amines as epoxy hardener provides several advantages, in particular a low initial viscosity of the mixed epoxy resin composition for easy liner impregnation, while still providing an initial increase of the viscosity reducing the risk of resin sagging during curing process. Furthermore, the composition according to the present invention provides a long storage time at between −5° C. and 15° C. of at least 3 days up to at least one week, thus enabling an off-site liner impregnation and facilitated CIPP process. Additionally, the composition exhibits a short curing time with a curing process involving steam or hot water.

The invention relates in a first aspect to a two-component epoxy resin composition, consisting of
a resin component K1 comprising:
at least one epoxy resin A that contains on average more than one epoxy group per molecule;
up to 25 wt.-%, based on component K1, of at least one epoxy-functional reactive diluent RD having at least one epoxy groups per molecule; and
a hardener component K2 comprising:
between 40 and 80 wt.-%, based on component K2, of at least one amino-functional hardener B of formula (I),

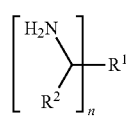

wherein n is an integer with a value of 2 or 3, $R^1$ is a linear, cyclic or branched alkyl residue that optionally contains ether oxygen atoms and $R^2$ is a methyl or ethyl group;
between 10 and 30 wt.-%, based on component K2, of at least one Lewis base LB having at least one tertiary amino group, amidine group, or guanidine group; and between 10 and 30 wt.-%, based on component K2, of at least one carboxylic acid AC.

Other aspects of the present invention are the subject matter of additional independent claims. Especially preferred embodiments are the subject matter of the dependent claims.

Ways of Carrying Out the Invention

The term "polymer" as used in the present document, on the one hand, refers to a collective of chemically uniform macromolecules prepared by a polyreaction (polymerization, polyaddition, polycondensation) where, however, the macromolecules differ with respect to their degree of polymerization, molecular weight and chain length. On the other hand, the term also comprises derivatives of said collective of macromolecules resulting from polyreactions, that is, compounds which were obtained by reactions such as, e.g., additions or substitutions, of functional groups in predetermined macromolecules and which may be chemically uniform or chemically non-uniform. Moreover, the term also comprises so-called prepolymers, that is, reactive organic pre-adducts, the functional groups of which participate in the formation of macromolecules.

The term "polymeric diol" describes a polymer having, at least on average, two hydroxyl groups, typically at the polymer chain ends.

The prefix "poly" in substance names such as "polyether" or "polyamine" in the present document means that the respective substance formally contains more than one of the functional group present in its name per molecule.

"Molecular weight" or, synonymously, "molar mass" is defined in the present document as the molar mass (in grams per mole) of a molecule. The "average molecular weight" or "average molar mass" is the term used for the average molar mass Mn of an oligomeric or polymeric mixture of molecules, which is usually determined by GPC against polystyrene as standard.

"Primary hydroxyl group" is the term applied to an OH group bonded to a C-Atom with two hydrogens.

In this document, the use of the term "independently of one another" in connection with substituents, moieties or groups should be interpreted such that substituents, moieties or groups with the same designation may be present simultaneously in the same molecule with different definitions.

The term "room temperature" ("RT") refers to a temperature of 23° C., if not otherwise specified.

All industrial standards and norms cited refer to the most recent versions at the time of first filing of this patent application, if not otherwise specified.

The terms "weight" refers in this document to the mass of a compound or composition as measured in kilograms.

The two-component epoxy resin composition consists of two components. The first component K1, the resin component, contains all epoxy-functional compounds.

The second component K2, the hardener component, contains chemical species that are able to react with epoxies under formation of a cross-linked or chemically cured product. Typically, these hardener compounds are amines.

Components K1 and K2 are mixed together before or during application, which starts the cross-linking or curing reactions, especially under influence of heat, and ultimately yields a cured, hardened product.

The two-component epoxy resin composition contains a first component K1 comprising least one epoxy resin A that contains on average more than one epoxy group per molecule. Preferably, the amount of said epoxy resin A in the two-component composition is between 60 and 90 wt.-%, in particular between 70 and 80 wt.-%, based on the total weight of the two-component composition.

The epoxy resin A contained in the first component K1 of the two-component composition may be any conventional di- or multifunctional epoxy resin used in this field. Suitable epoxy resins are available e.g. from the reaction of an epoxide compound such as e.g. epichlorohydrin with a polyfunctional aliphatic or aromatic alcohol, i.e. a diol, triol or polyol. One or more epoxy resins may be used.

The epoxy resin A that contains on average more than one epoxy group per molecule is preferably a liquid epoxy resin and/or a solid epoxy resin.

The term "solid epoxy resin" is very well known to a person skilled in the art of epoxides and is used in contrast to "liquid epoxy resins". The glass transition temperature of solid resins is above room temperature, i.e. they can be comminuted to free-flowing powders at room temperature.

Suitable as an epoxy liquid resin or solid epoxy resin is in particular a diglycidyl ether, e.g. of the formula (I)

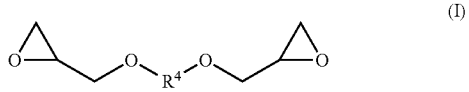

wherein $R^4$ is a divalent aliphatic or mononuclear aromatic or a dinuclear aromatic radical.

Examples of such diglycidyl ethers are in particular diglycidyl ethers of difunctional saturated or unsaturated, branched or unbranched, cyclic or open-chain $C_2$-$C_{30}$ alcohols, such as e.g. ethylene glycol, butanediol, hexanediol, or octanediol glycidyl ether, cyclohexane dimethanol diglycidyl ether, neopentyl glycol diglycidyl ether;

Diglycidyl ethers of difunctional, low to high molecular weight polyether polyols, e.g. polyethylene glycol diglycidyl ether, polypropyleneglycol diglycidyl ether;

Diglycidyl ethers of difunctional diphenols and optionally triphenols, which are understood not only pure phenols, but optionally also substituted phenols.

The type of substitution can be very diverse. In particular, this is understood to mean a substitution directly on the aromatic nucleus to which the phenolic OH group is bonded. In addition, phenols are understood to mean not only mononuclear aromatics but also polynuclear or condensed aromatics or heteroaromatics which have the phenolic OH group directly on the aromatic or heteroaromatic compounds. As bisphenols and, optionally, triphenols, 1,4-dihydroxybenzene, 1,3-dihydroxybenzene, 1,2-dihydroxybenzene, 1,3-dihydroxytoluene, 3,5-dihydroxybenzoate, 2,2-bis (4-hydroxyphenyl) are, for example, suitable. propane (=bisphenol-A), bis (4-hydroxyphenyl) methane (=bisphenol-F), bis (4-hydroxyphenyl) sulfone (=bisphenol-S), naphthoresorcinol, dihydroxynaphthalene, dihydroxyanthraquinone, dihydroxy-biphenyl, 3,3-Bis (p-hydroxyphenyl) phthalide, 5,5-bis (4-hydroxy-phenyl) hexahydro-4,7-methanoindane, phenolphthalein, fluorescein, 4,4'-[bis (hydroxyphenyl)-1,3-phenylenebis (1-methyl-ethylidene)] (=bisphenol-M), 4,4'-[bis (hydroxyphenyl)-1,4-phenylenebis (1-methyl-ethylidene)] (=bisphenol-P), 2,2'-diallyl-bisphenol-A, diphenols and dicresols prepared by reacting phenols or cresols with diisopropylidenbenzene, phloroglucin, bile acid esters, phenol or cresol novolaks with —OH functionality of 2.0 to 3.5 and all isomers the aforementioned compounds.

Preferred solid epoxy resins A have the formula (II)

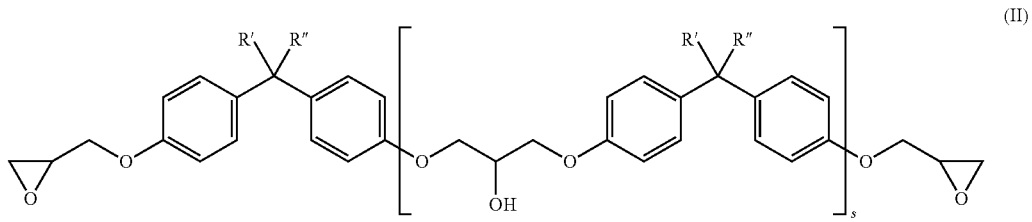

In this formula, the substituents R' and R" are each independently H or $CH_3$. In addition, the index s has a value of >1.5, in particular of 2 to 12.

Such solid epoxy resins are commercially available, for example from Dow, Huntsman or Hexion.

Compounds of the formula (II) with an index s between 1 and 1.5 are referred to by a person skilled in the art as semisolid epoxy resins. For this present invention, they are likewise considered to be solid resins. However, preferred are epoxy resins in the narrower sense, i.e. the index s has a value of >1.5.

Preferred liquid epoxy resins A have the formula (III)

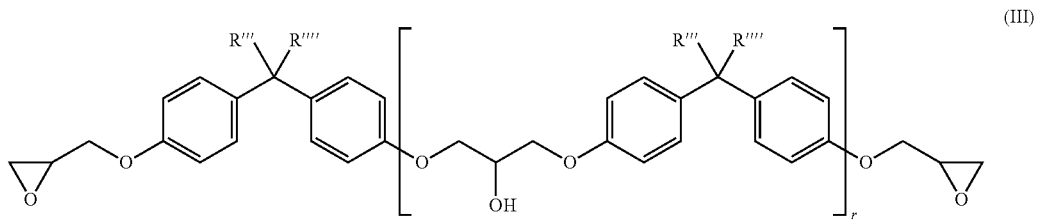

In this formula, the substituents R''' and R'''' are each independently H or CH₃. In addition, the index r has a value of 0 to 1. Preferably, r has a value of less than 0.2.

These are thus preferably diglycidyl ethers of bisphenol A (DGEBA), of bisphenol F and of bisphenol A/F (here, the designation "A/F" refers to a mixture of acetone with formaldehyde which is used as the reactant in the preparation thereof). Such liquid resins are available, for example, as Araldite® GY 250, Araldite® PY 304, Araldite® GY 282 (Huntsman), or D.E.R.™ 331, or D.E.R.™ 330 (Olin), or Epikote 828 (Hexion).

Moreover, so-called novolacs are suitable epoxy resins A. These have in particular the following formula:

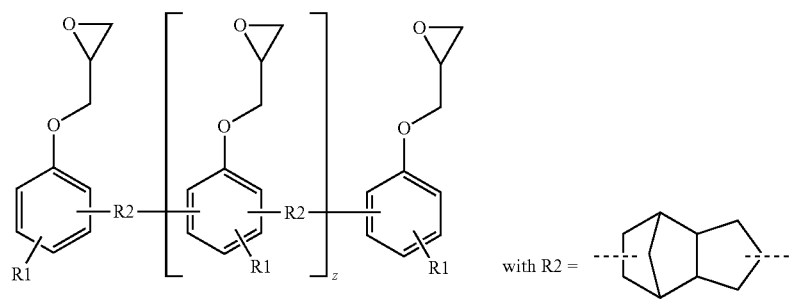

R1=H or methyl and z=0 to 7.

In particular, they are phenol or cresol novolacs (R2=CH₂).

Such epoxy resins are commercially available under the trade names EPN or ECN as well as Tactix® 556 from Huntsman or under the product line D.E.N.™ from Dow Chemical.

Preferably, the epoxy resin A is a liquid epoxy resin of the formula (III). In an even more preferred embodiment, the heat-curing epoxy resin composition contains at least one liquid epoxy resin of formula (III) as well as at least one solid epoxy resin of formula (II).

Particular preference is given to bisphenol A diglycidyl ether, bisphenol F diglycidyl ether or bisphenol A/F diglycidyl ether, in particular Araldite® GY 240, Aralite® GY 250, Araldite® GY 281, Araldite® GY 282, Araldite® GY 285, Araldite® PY 304 or Araldite® PY 720 (all from Huntsman), or D.E.R.® 330, D.E.R.® 331, D.E.R.® 332, D.E.R.® 336, D.E.R.® 351, D.E.R.® 352, D.E.R.® 354 or D.E.R.® 356 (all from Olin), or novolak glycidyl ether.

Preferred is a novolak glycidyl ether that is derived from phenol-formaldehyde novolaks, which are also referred to as epoxy phenol novolac resins.

Such novolac glycidyl ethers are commercially available, for example from Olin, Huntsman, Momentive or Emerald Performance Materials. Preferred types are D.E.N.® 431, D.E.N.® 438 or D.E.N.® 439 (from Olin), Araldite® EPN 1179, Araldite® EPN 1180, Araldite® EPN 1182 or Araldite® EPN 1183 (from Huntsman), Epon® 154, Epon®160 or Epon® 161 (from Momentive) or Epalloy® 8250, Epalloy® 8330 or Epalloy® 8350 (from Emerald Performance Materials).

In preferred embodiments of the two-component epoxy resin composition, said epoxy resin A comprises liquid bisphenol A diglycidyl ethers and optionally liquid bisphenol F diglycidyl ethers with a viscosity at 25° C., measured according to ASTM D-445, in the range of 8 to 12 Pa·s, preferably 8 to 10 Pa·s. This viscosity range allows for an especially advantageous impregnation of the felt liner and especially good mechanical properties of the composition.

Additionally, mono-, di- and multifunctional reactive diluents RD may be comprised in component K1 of the composition. Preferably the reactive diluents present within the range of 0.1 to about 25 wt.-% based on the weight of component K1.

Reactive diluents help adjusting the viscosity of component K1 and ultimately the mixed two-component composition within a viscosity range that makes the composition suitable for a CIPP application. This is particularly useful if highly viscous or solid epoxy resins A are employed.

Suitable reactive diluents RD are in particular:

glycidyl ethers of monofunctional saturated or unsaturated, branched or unbranched, cyclic or open-chain C₄-C₃₀ alcohols, in particular selected from the group consisting of butanol glycidyl ether, hexanol glycidyl ether, 2-ethylhexanol glycidyl ether, allyl glycidyl ether, tetrahydrofurfuryl and furfuryl glycidyl ether, trimethoxysilyl glycidyl ether.

glycidyl ethers of difunctional saturated or unsaturated, branched or unbranched, cyclic or open-chain C₂-C₃₀ alcohols, in particular selected from the group consisting of ethylene glycol, butanediol, hexanediol, or octanediol glycidyl ethers, cyclohexane dimethanol diglycidyl ether and neopentyl glycol diglycidyl ether, glycidyl ethers of tri- or polyfunctional, saturated or unsaturated, branched or unbranched, cyclic or open-chain alcohols, such as epoxidized castor oil, epoxidized trimethylolpropane, epoxidized pentaerythritol or polyglycidyl ethers of aliphatic polyols such as sorbitol, glycerol or trimethylol propane.

glycidyl ethers of phenol and aniline compounds, in particular selected from the group consisting of phenyl glycidyl ether, cresyl glycidyl ether, p-tert-butyl-phenyl glycidyl ether, nonylphenol glycidyl ether, 3-n-pentadecenyl glycidyl ether (from cashew nut shell oil), N,N-diglycidyl aniline and triglycidyl of p-aminophenol.

epoxidized amines such as N,N-diglycidyl cyclohexylamine.

epoxidized mono- or dicarboxylic acids, in particular selected from the group consisting of glycidyl neodecanoate, glycidyl methacrylate, glycidyl benzoate, diglycidyl phthalate, tetra- and hexahydrophthalate and diglycidyl esters of dimeric fatty acids and diglycidyl esters of terephthalic acid and trimellitic acid.

epoxidized di- or trifunctional, low to high molecular weight polyether polyols, in particular polyethylene glycol diglycidyl ether or polypropylene glycol diglycidyl ether.

Particularly preferred are hexanediol diglycidyl ether, cresyl glycidyl ether, p-tert-butylphenyl glycidyl ether, polypropylene glycol diglycidyl ether and polyethylene glycol diglycidyl ether.

Advantageously, the total proportion of the reactive diluent is from 1 to 20 wt.-%, preferably from 8 to 18 wt.-%, based on the weight of the total two-component composition.

In preferred embodiments of the two-component epoxy resin composition, said reactive diluent RD comprises linear or branched C12 to C14 monoglycidyl ethers and/or linear or branched C2 to C6 diglycidyl ethers.

In preferred embodiments of the two-component epoxy resin composition, the two-component epoxy resin composition contains said reactive diluent RD with an amount of between 10 and 20 wt.-%, based on resin component K1.

The two-component epoxy resin composition contains a second component K2 comprising between 40 and 80 wt.-%, in particular between 10 and 30 wt.-%, based on the total weight of component K2, of a hardener B for epoxy resins.

Hardener B present in the composition is according to formula (I),

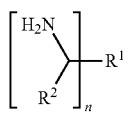

wherein n is an integer with a value of 2 or 3, $R^1$ is a linear, cyclic or branched alkyl residue that optionally contains ether oxygen atoms and $R^2$ is a methyl or ethyl group.

This hardener B may also comprise a mixture of different hardeners according to formula (I).

All di- and triamines according to formula (I) are basically suitable as hardener B. Preferably, residue $R^1$ is an aliphatic, cycloaliphatic or arylaliphatic residue or a polyether residue, in particular a poly(oxypropylene) residue.

Examples of suitable hardeners B include, for example aliphatic, cycloaliphatic or arylaliphatic primary diamines and triamines,
  e.g, 1,2-, 1,3- and 1,4-diaminocyclohexane, bis-(4-aminocyclohexyl)-methane (H12-MDA), bis-(4-amino-3-methylcyclohexyl)methane, bis-(4-amino-3-ethylcyclohexyl)methane, bis-(4-amino-3,5-dimethylcyclohexyl)methane, bis-(4-amino-3-ethyl-5-methylcyclohexyl)methane (M-MECA), 2- and 4-methyl-1,3-diaminocyclohexane and mixtures thereof;
aliphatic primary diamines and triamines containing ether groups,
  e.g., polyoxyalkylenediamines. Typically, these are products of the amination of polyoxyalkylene diols and can, for example, be obtained under the name Jeffamine® (from Huntsman), under the name Polyetheramin (from BASF) or under the name PC Amine® (from Nitroil) or under the trade name Baxxodur® (from BASF). Particularly suitable polyoxyalkylenediamines are Jeffamine® D-230, Jeffamine® D-400, Jeffamine® D-2000, Jeffamine® D-4000, Jeffamine® ED-600, Jeffamine® ED-900, Jeffamine® ED-2003, Jeffamine® D-205, Jeffamine® T-403, Jeffamine® T-3000, Jeffamine® T-5000; Polyetheramin D 230, Polyetheramin D 400, and Polyetheramin D 2000, PC Amine® DA 250, PC Amine® DA 400, PC Amine® DA 650, PC Amine® DA 2000, and Baxxodur® EC 310.

Suitable polyamines are in particular polyoxyalkylenediamines and -triamines having molecular weights of less than 500 g/mol (Jeffamine® D-205, Jeffamine® T-403, Baxxodur® EC 310). These polyamines have a relatively low viscosity yet still allow for cured products with especially suitable mechanical properties.

In particular, polyamines that preferably are diamines or triamines, are selected from the group consisting of aliphatic diamines or triamines containing ether groups, in particular polyoxyalkylenediamines and -triamines; in particular polyoxyethylenediamines and -triamines, polyoxypropylenediamines and -triamines; polyoxybutylenediamines and -triamines, amino group terminated polybutadienes and mixtures thereof.

In particular, these are polyoxyalkylene polyamines having two or three amino groups such as are commercially available, for example, under the name Jeffamine® (from Huntsman Chemicals), under the name Polyetheramin (from BASF) or under the name PC Amine® (from Nitroil) and mixtures of the above-mentioned polyamines.

In preferred embodiments of the two-component composition according to the present invention, said hardener B comprises di- and/or tri-functional polyetheramines.

In preferred embodiments of the two-component composition according to the present invention, said residue $R^1$ in formula (I) is an oligomer or polymer containing oxypropylene repeating units.

In preferred embodiments of the two-component composition according to the present invention, said hardener B has an amine hydrogen equivalent weight of between 50 and 100 g/eq, preferably between 55 and 85 g/eq.

Furthermore, the hardener component K2 comprises a Lewis base LB having at least one tertiary amino group, amidine group, or guanidine group, with an amount of between 10 and 30 wt.-%, based on component K2.

In some preferred embodiments, said Lewis base LB contains no other nitrogen-containing groups than at least one tertiary amino group, amidine group, or guanidine group. In other preferred embodiments, primary or secondary amino groups may be present in said Lewis base LB.

Examples of suitable Lewis bases LB are tertiary amines such as 1,4-diazabicyclo [2.2.2] octane and triethanolamine, amidines, in particular 1,8-diazabicyclo[5.4.0]undec-7-enes, guanidines, in particular 1,1,3,3-tetramethylguanidine, tertiary amine-group containing phenols, such as in particular 2,4,6-tris(dimethylaminomethyl) phenol. Preferred as accelerators are tertiary amines, amidines, or guanidines.

Most preferred among those are tris-2,4-6-dimethylaminomethyl phenol, 1,1,3,3-tetramethylguanidine, and 1,8-diazabicyclo[5.4.0]undec-7-ene, or mixtures thereof.

Furthermore preferred as accelerators are in particular compounds comprising at least one dimethylamino group. in particular benzyldimethylamine, α-methylbenzyldimethylamine, N,N-diethyl-N',N'-dimethyl-1,3-propanediamine, N,N-dimethylethanolamine, 3-(N,N-dimethylamino)propane-1-ol, 2- or 4-(dimethylaminomethyl)phenol, 2,4- or 2,6-bis(N,N-dimethylaminomethyl)phenol, 2,4,6-tris(N,N-dimethylaminomethyl)phenol, 2,4,6-tris(N,N-dimethyl-4-amino-2-azabutyl)phenol or in particular N,N,N',N'-tetra-methyl-1,2-ethanediamine, N,N,N',N'-tetramethyl-1,3-propanediamine, N,N,N',N'-tetramethyl-1,4-butanediamine, N,N,N',N'-tetramethyl-1,6-hexanediamine, N, N,N',N',N"-pentamethyldiethylenetriamine, N,N,N',N',N"-Pentamethyldipropylentriamine, N,N,N',N',N"-pentamethyl-N-(2-aminoethyl)-1,3-propanediamine, N,N-dimethyl-1,2-ethanediamine, N,N-dimethyl-1,3-propanediamine, N,N-dimethyl-1,4-butanediamine, N,N-dimethyl-1,6-hexanediamine, 2-(2-(dimethylamino)ethylamino)ethylamine, 2-(3-(dimethylamino)propylaminoethylamine, 3-(2-(dimethylamino)ethylamino)propylamine, 3-(3-(dimethylaminopropylamino)propylamine (DMAPAPA), Bis (2-(N,N-dimethylamino)ethyl) amine or bis(3-(N,N-dimethylamino)propyl) amine.

Particularly preferred is N,N,N',N',N"-pentamethyldiethylenetriamine, 3-(3-(dimethylamino)propylamino)propylamine (DMAPAPA) or bis(3-(N,N-dimethylamino)propyl)amine. These accelerators are easily available, have low odor and enable high compressive strengths, high adhesive forces and hardly any curing problems in the cold. Most preferred as accelerator is 3-(3-(dimethylamino)propylamino)propylamine (DMAPAPA). DMAPAPA has a low odor, is toxicologically safe and commercially available.

In preferred embodiments of the two-component composition according to the present invention, said Lewis base LB is selected from the group consisting of tris-2,4-6-dimethylaminomethyl phenol, 1,1,3,3-tetramethylguanidine, and 1,8-diazabicyclo[5.4.0]undec-7-ene.

Furthermore, the hardener component K2 comprises at least one carboxylic acid AC with an amount of between 10 and 30 wt.-%, based on component K2.

Suitable as carboxylic acid AC are all compounds having a linear, cyclic, or branched hydrocarbon structure with optional aromatic moieties and optional comprising heteroatoms. These include monoxarboxylic acids and polycarboxylic acids. Preferred, however, are monocarboxylic acids having a linear, cyclic, or branched hydrocarbon structure with optional aromatic moieties and optional comprising heteroatoms, preferably, however, not comprising heteroatoms.

Examples of suitable and preferred monocarboxylic acids are, e.g., acetic acid, propionic acid, oleic acid, butyric acid, valeric acid, caprionic acid, enanthic acid, caprylic acid, benzoic acid, salicylic acid, 2-nitrobenzoic acid, lactic acid, pelargonic acid, capric acid, undelic acid, lauric acid, tridelic acid, myristic acid, isononanoic acid, pentadelic acid, palmitic acid, margaric acid, stearic acid, nonadecylic acid, arachidic acid, and branched and/or cyclic isomers of these acids, such as 2-methylbutyric acid, as well as non-saturated forms with the same amount of carbon atoms. Most preferred among those are oleic acid, n-valeric acid, 2-methylbutyric acid, isononanoic acid, and 2-ethylhexanoic acid. Especially preferred are isononanoic acid and oleic acid, since they have especially low toxicity, good performance, and no unpleasant odor.

Examples of suitable polycarboxylic acids are, for example, succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, isophthalic acid, terephthalic acid, hexahydrophthalic acid, or mixtures of the aforementioned acids.

In preferred embodiments of the two-component composition according to the present invention, said carboxylic acid AC is a linear or branched C2 to C18 monocarboxylic acid, in particular a C6 to C12 monocarboxylic acid.

The molar ratio of carboxylic acid groups of acid AC to tertiary amino groups of Lewis base LB in the composition is preferably between 0.5 and 1.0, in particular between 0.6 and 0.95.

Moreover, the two-component epoxy resin composition may optionally comprise further additives. These are, for example:

inorganic and organic fillers, for example, ground or precipitated calcium carbonates, optionally coated with fatty acids, in particular stearates, barium sulfate (heavy spar), talcs, quartz flours, quartz sands, dolomites, wollastonites, kaolins, mica (potassium aluminum silicate), molecular sieves, aluminas, aluminum hydroxides, silicas (pyrogenic or precipitated), cristobalite, cements, gypsums, flue ashes, carbon blacks, graphite, metal powders such as aluminum, copper, iron, silver, or steel, PVC powders or hollow spheres, such as solid or hollow glass spheres and organic hollow spheres, layer minerals, in particular layered minerals exchanged with organic ions, in particular layered silicate;

toughening agents including but not limited to CTBN rubbers, amphiphilic block copolymers, block copolymers based on CRP from Arkema, and core-shell rubbers;

solvents, film forming auxiliaries or extenders such as toluene, xylene, methylethyl ketone, 2-ethoxyethanol, 2-ethoxyethyl acetate, benzyl alcohol, ethylene glycol, diethylene glycol butyl ether, dipropylene glycol butyl ether, ethylene glycol butyl ether, ethylene glycol phenyl ether, N-methylpyrrolidone, propylene glycol butyl ether, propylene glycol phenyl ether, diphenylmethane, diisopropylnaphthalene, mineral oil fractions such as, for example, Solvesso types (from Exxon), aromatic hydrocarbon resins, in particular phenol group containing types, sebacates, phthalates, organic phosphoric and sulfonic esters and sulfonamides;

reactive dilutants, e.g., epoxy reactive dilutants which have been mentioned above, epoxidized soy oil or flax oil, compounds having acetoacetate groups, in particular acetoacetylated polyols, butyrolactone as well as, moreover, isocyanates and silicones having reactive groups;

polymers such as, e.g., polyamides, polysulfides, polyvinylformal (PVF), polyvinylbutyral (PVB), polyurethanes (PUR), polymers containing carboxylic groups, polyamides, butadiene-acrylonitrile copolymers, styrene-acrylonitrile copolymers, butadiene-styrene-copolymers, homo- or copolymers of unsaturated monomers, in particular of the group comprising ethylene, propylene, butylene, isobutylene, isoprene, vinyl acetate, and alkyl(meth)acrylates, in particular chlorosulfonated polyethylenes and polymers containing fluorine, sulfonamide-modified melamines, and cleaned montan waxes;

fibers, for example, of plastics, carbon, or glass;

pigments, for example, titanium dioxide or iron oxides or organic pigments;

rheology modifiers such as, in particular, thickeners, for example, sheet silicates such as bentonites, derivatives of castor oil, hydrogenated castor oil, polyamides, polyurethanes, urea compos, pyrogenic silicic acids, cellulose ethers, and hydrophobically modified polyoxyethylenes;

adhesion promoters, for example, organoalkoxysilanes such as 3-glycidoxypropyltrimethoxysilane, 3-aminopropyltrimethoxysilane, N-(2-aminoethyl)-3-aminopropyltrimethoxysilane, N-(2-aminoethyl)-N'[3-(trimethoxysilyl)propyl]ethylenediamine, 3-ureidopropyltrimethoxysilane, 3-chloropropyltrimethoxysilane, vinyltrimethoxysilane, or the corresponding organosilanes with ethoxy groups or (poly)etheroxy groups instead of methoxy groups;

oxidation, corrosion, heat, light, and UV radiation stabilizers;

flame retardants, in particular compounds such as alumina (Al(OH)$_3$; also called ATH for "aluminum trihydrate"), magnesium hydroxide (Mg(OH)$_2$; also called MDH for "magnesium dihydrate"), ammonium sulfate ((NH$_4$)$_2$SO$_4$), boric acid (B(OH)$_3$), zinc borate, melamine borate, and melamine cyanurate; compounds containing phosphorus such as ammonium phosphate ((NH$_4$)$_3$PO$_4$), ammonium polyphosphate, melamine phosphate, melamine pyrophosphate, triphenyl phosphate, diphenyl cresyl phosphate, tricresyl phosphate, triethyl phosphate, tris-(2-ethylhexyl) phosphate, trioctyl phosphate, mono-, bis-, and tris(isopropylphenyl) phosphate, resorcinolbis(diphenyl phosphate), resorcinol diphosphate oligomer, tetraphenylresorcinol diphosphite, ethylendiamine diphosphate, and bisphenol A bis(diphenyl phosphate); halogen-containing compounds such as chloroalkylphosphates, in particular tris(chloroethyl) phosphate, tris(chloropropyl) phosphate, and tris(dichloroisopropyl) phosphate, polybrominated diphenyl ethers, in particular decabromodiphenyl ether, polybrominated diphenyl oxide, tris[3-bromo-2,2-bis(bromomethyl)propyl]phosphate, tetrabromo bisphenol A, bis(2,3-dibromopropyl ether) of bisphenol A, brominated epoxy resins, ethylene-bis(tetrabromophtalimide), ethylenebis(dibromonorbornanedicarboximide), 1,2-bis-(tribromophenoxy)ethane, tris(2,3-dibromopropyl) isocyanurate, tribromophenol, hexabromocyclododecane, bis(hexachlorocyclopentadieno)cyclooctane, and chloroparaffins; as well as combinations of a halogen-containing compo and antimony trioxide (Sb$_2$O$_3$), or antimony pentoxide (Sb$_2$O$_5$);

surfactants such as, for example, wetting agents, flow control agents, deaerating agents or defoaming agents;

biocides, such as, for example, algicides, fungicides or substances that inhibit fungal growth.

It is clear and known to a person skilled in the art which additives may be added to the resin component K1 and which may be added to the hardener component K2. Here, in particular, it has to be ensured that the storage stability is not or only slightly impaired by such additives. Thus, it is clear to a person skilled in the art that a polyamine will react with epoxides in the resin component K1 and can consequently only be comprised in the hardener component K2.

The concentration of the optional components as one of the epoxy resin portions of the formulation may range generally from 0.1 wt.-% to about 20 wt.-% based on the total composition.

In preferred embodiments, the two-component epoxy resin composition contains in either one or both of components K1 and K2 such additives, preferably selected from the list consisting of adhesion promoters, wetting agents, and degassing agents, with an amount of between 0.1 and 5 wt.-%, preferably between 0.25 and 4 wt.-%, in particular between 0.5 and 3 wt.-%, based on total two-component composition.

The epoxy equivalent weight (EEW) of the epoxy resin and the optional components described above if used may range generally from about 130 to about 250 in one embodiment; from about 150 to about 225 in yet another embodiment; and from about 170 to about 220 in still another embodiment.

The viscosity of the epoxy resin and optional components described above may generally range from about 200 to about 10,000 mPa·s in one embodiment; from about 300 to about 5000 mPa·s in yet another embodiment; and from about 400 to about 2000 mPa·s in still another embodiment.

A preferred embodiment of the two-component epoxy resin composition according to the present invention consists of:

said first component K1, comprising between 75 and 95 wt.-%, preferably between 80 and 90 wt.-%, based on component K1, of said least one epoxy resin A, and between 5 and 25 wt.-%, preferably between 10 and 20 wt.-%, based on component K1, of at least one epoxy-functional reactive diluent RD;

said second component K2, comprising between 40 and 80 wt.-%, preferably between 50 and 70 wt.-%, based on component K2, of said hardener B, and between 10 and 30 wt.-%, preferably between 15 and 25 wt.-%, based on component K2, of said Lewis base LB, and between 10 and 30 wt.-%, preferably between 15 and 25 wt.-%, based on component K2, of said carboxylic acid AC.

Above preferred two-component composition is preferably mixed with a mixing ratio K1:K2 of about 10:1 (weight/weight).

In the two-component epoxy resin composition according to the present invention, the ratio of the number of amine groups which are reactive toward epoxide groups relative to the number of epoxide groups is preferably in the range of 0.7 to 1.5, in particular 0.8 to 1.2.

Preferably, the mixing ratio by volume or weight of the two components K1 and K2 is adjusted such that the mentioned ratio of the number of amine groups which are reactive toward epoxide groups relative to the number of epoxide groups is established.

Alternatively, the respective amounts of epoxy resin A and hardener B within component K1 and K2, respectively, is adjusted such that the above mentioned ratio of the number of amine groups which are reactive toward epoxide groups relative to the number of epoxide groups is established in a given mixing ratio, for example as defined by the application apparatus. A preferred mixing ratio is for example approximately K1 K2=10:1 by weight.

The components K1 and K2 of the two-component epoxy resin composition are stored before mixing and application in separate containers. A suitable container for storing the resin K1 or hardener K2 component is in particular a barrel, a bag, a bucket, a can, a cartridge or a tube. The components are storage-stable, which means that they can be stored for several months to a year or longer before use, without changing in their respective properties to a degree relevant to their use. For the application of the epoxy resin composition, the resin and the hardener component K1 and K2 and an optionally present further component are mixed together shortly before or during the application.

The mixing of the components takes place by means of a suitable method. The mixing can be continuous or batch wise. If the mixing takes place before the application, care must be taken that the mixing of the components and the application does not take too much time, since this can lead to disturbances, for example to a slowed or incomplete buildup of the adhesion. The mixing takes place in particular at ambient temperature, which is typically in the range of about 0 to 40° C., preferably at about 5 to 30° C.

The two-component epoxy resin composition according to the present invention exhibits a viable storage time of at least up to one week, preferably up to two weeks at between −5° C. and 15° C. in the mixed state and a short curing process within less than a few hours at between 60 and 100°

C. using hot water, hot air, or steam in accordance with the technical requirements for CIPP processes as specified in ISO 11296-4 and ASTM D 5813.

After mixing of the components, and under elevated temperature conditions, the curing begins by chemical reaction. In this case, the epoxide groups react with the amino hydrogen-carrying amino groups and any other groups which are reactive toward epoxide groups and ring-open to give amino alcohol units. Further epoxide groups react with one another under anionic polymerization, in particular catalyzed by the Lewis base LB. As a result of these reactions, the adhesive cures to a crosslinked material. It is known to the person skilled in the art that primary amino groups are "difunctional" towards epoxide groups, meaning they can react with two separate epoxy groups.

Curing takes place especially at ambient temperature. It typically extends over a few hours until it is largely completed under the conditions given. Important influencing factors are the temperature, the stoichiometry and the presence of accelerators.

As a result of the curing reaction, a cured resin is obtained.

The previously described two-component epoxy resin composition is highly suitable and preferably used in a cured-in-place pipe (CIPP) rehabilitation process, in particular as specified in ISO 11296-4 and ASTM D 5813.

There are two main processes used for the cured-in-place pipe (CIPP) application, i.e. the "inversion installation method" and the "pull-in installation method". The first mentioned process of lining the pipe is described in detail in method ASTM F 1216: "Standard practice for Rehabilitation of Existing Pipelines and Conduits by the Inversion and Curing of a Resin-Impregnated Tube". The latter mentioned method of lining the pipe is described in detail in method ASTM F 1743: "Standard Practice for Rehabilitation of Existing Pipelines and Conduits by Pulled-in-Place Installation of Cured-in-Place Thermosetting Resin Pipe" or ASTM F2019: "Standard Practice for Rehabilitation of Existing Pipelines and Conduits by the Pulled-in-Place Installation of Glass Reinforced Plastic (GRP) Cured-in-Place Thermosetting Resin Pipe" (CIPP)".

The previously described two-component epoxy resin composition is particularly suitable and most preferably used in the so-called inversion method CIPP process according to ASTM F1216. This process includes impregnating a flexible non-woven felt liner with the two-component composition according to the present invention, inverting the impregnated flexible non-woven felt liner into a host pipe and curing the liner which is now in an existing pipe. The two-component epoxy resin composition useful for repair of pipes has to properly wet the liner. The liner is generally a laminate of non-woven felt coated with a plastic sheet material as a membrane. Preferred materials for the sheet are polyvinyl chloride (PVC), thermoplastic polyurethane (TPU), silicone, or polyolefin, in particular polypropylene.

The liner can be non-woven felt or a fiber glass reinforced non-woven felt, or glass fiber reinforced liners, but also a glass fiber or natural fiber felt, such as flax fiber, sisal or hemp fiber. Preferred materials are polymeric felts, in particular polyester felts that may optionally be fiber-reinforced.

The non-woven felt liner is impregnated with an uncured two-component epoxy resin composition at room temperature. The felt liner thickness is generally in the range of from about 3 mm to about 25 mm. The infusion is generally done at room temperature or slightly below between about 10° C. to about 30° C., preferably between 12 and 25° C. The felt liner is normally stitched in cylindrical form (the shape of the host pipe) and is made to fit snugly in the host pipe. The diameter of the liner can, depending on the host pipe, be from about 200 to 500 mm up to from about 600 mm to 1200 mm. The amount of the two-component epoxy resin composition used to infuse the felt liner depends on the host pipe diameter and the felt thickness. The general range for two-component epoxy resin composition usage is about 1.5 kg/m to about 75 kg/m. The impregnated liner is inverted inside out along the pipe using, for example, fluid pressure bringing the uncured two-component epoxy resin composition now in contact with the host pipe. When the two-component epoxy resin composition is cured, the impregnated liner forms a rigid shell inside the host pipe and adhesively adhering to the host pipe, resulting in a smooth new inner surface.

The pipe to be repaired can be of any material suitable for pipes, in particular concrete, steel-reinforced concrete, ceramics or stone, fiber cement, plastics, such as glass-fiber reinforced resins, polyvinyl chloride, polyethylene, polypropylene, and metals, such as cast iron.

The curing of the formulation may be carried out at a predetermined temperature and for a predetermined period of time sufficient to cure the formulation. For example, the temperature of curing the formulation may be generally be in the range of from about 30° C. to about 150° C., preferably from 50° C. to 120° C., in particular from 60° C. to 100° C. The curing time may be in the range of from about 30 minutes to about 24 hours, preferably between 1 h and 16 h, in particular between 3 h and 12 h. The curing is usually done with hot water or high pressured steam.

There are minimum flexural modulus and flexural strength requirements for CIPP applications. The flexural properties are determined using method ASTM D 790. In some instances depending on the end use application, it is necessary for the cured specimen ability to withstand chemical reagents. The chemical resistance test is done following method ASTM D 543. The method evaluates change in weight and retention of flexural properties in the presence of chemical reagents.

Another aspect of the present invention is a process for relining a pipe, comprising the steps:

1) Preparing a two-component epoxy resin composition according to any of the embodiments described above;

2) Mixing said two-component epoxy resin composition;

3) Impregnating a relining felt material with said mixed epoxy resin composition;

4) Applying said epoxy-resin impregnated relining felt material in a cured-in-place pipe rehabilitation (CIPP) process.

The CIPP process and the relining felt material are according to the specifications mentioned further above.

In preferred embodiments of this process, said relining felt material is a polyester felt, In particular a fiber-reinforced polyester felt, preferably a glass-fiber reinforced polyester felt, or a glass fiber felt. Furthermore suitable are natural fibers such as flax as felt material.

In the same or other preferred embodiments of this process, between step 3) and step 4) said impregnated felt material is stored up to at least one week, preferably up to at least two weeks at a storage temperature of between −15° C. and 25° C., preferably between −10° C. and 20° C., in particular between −5° C. and 15° C., before step 4) is applied.

In the same or other preferred embodiments of this process, step 3) is not performed at the same place than step 4).

This means that the impregnation step can take place off-site, e.g. in a warehouse or at a producer's site under cleaner and more controlled conditions, and subsequently stored, preferably at lower temperatures, until transport to the actual CIPP job site is done.

In the same or other preferred embodiments of this process, said mixed epoxy resin material with which the felt material is impregnated is cured during the CIPP process by steam or hot water.

A further aspect of the present invention is a felt material impregnated with a mixed two-component epoxy resin composition according to any embodiment described above.

Yet another aspect of the present invention is A pipe, relined using the process according to the description further above.

EXAMPLES

Examples are given below which illustrate the invention further but do not limit the scope of the invention in any way and merely illustrate some of the possible embodiments.) "Room temperature" (RT) refers to a temperature of 23° C. and 50% relative humidity (r.h.).

Test Methods

Viscosity

Viscosity was measured at 25° C., or the temperature indicated in the respective Table 3, 5, or 7, according to the following table:

Gel Time

Gel time was measured according to DIN 16945, § 6.3, method A, using a gel timer Gelnorm® from Gel Instrumente AG using mixtures of K1+K2 measured after mixing at room temperature during 1 min in the ratio as specified in Table 2. The actual measurements were done at 50° C. and 80° C., respectively.

$T_g$ Full Cure Onset/Midpoint

These data values were obtained using DSC (differential scanning calorimetry) according to ISO 11357-2.

Heat Deflection Temperature

Heat deflection temperature was measured according to ISO 75-2, method A (1.8 MPa) on fully cured samples after 16 h at 80° C. in a ventilated oven.

Flexural Modulus of Elasticity, Flexural Strength, and Elongation at Flexural Strength These values were determined according to ISO 178 on fully cured samples after 16 h at 80° C. in a ventilated oven.

Tensile Modulus, Tensile Strength, and Elongation at Break

These values were determined according to ISO 527-2 on fully cured samples after 16 h at 80° C. in a ventilated oven.

Fulfillment of ISO 11296-4:2018 Table 2 Requirement

This requirement stating that the heat reflection temperature needs to be above 70° C. according to ISO 75-2:2013 was evaluated and if the sample fulfilled the requirement, the result was "yes".

Example Two-Component Epoxy Resin Compositions

A series of two-component example composition were prepared using the substances listed in Table 1. Tables 2, 4, and 6 show example compositions consisting of components K1 and K2. All amounts are in wt.-% (percent by weight) based on the respective component K1 or K2.

| Technical data | C1 | C2 (Ref.) | C3 (Ref.) | C4-C12 |
|---|---|---|---|---|
| Component K1 Brookfield LVT | spindle 2, 25 rpm | spindle 3, 6 rpm | spindle 3, 6 rpm | spindle 2, 12 rpm |
| Component K2 Brookfield RVT | spindle 1, 60 rpm | spindle 1, 100 rpm | spindle 1, 100 rpm | spindle 1, 60 rpm |
| Mixture K1 + K2 LAMY rheometer with Peltier plate (cone/plate) | spindle 2, 25 rpm | spindle 2, 30 rpm | spindle 2, 12 rpm | spindle 2, 12 rpm |

The mixture K1+K2 was measured after mixing in the ratio as specified in Tables 2, 4, and 6 at room temperature or the temperature indicated in the respective Table during 1 min.

The individual components K1 and K2 in each experiment were prepared by adding the ingredients in their respective amount to a centrifugal mixer and mixing them homogeneously.

TABLE 1

Employed chemicals and ingredients.

| Abbreviation | Description | Trade name (supplier) |
|---|---|---|
| BPADGE1 | Liquid bisphenol A diglycidyl ether (EEW: 176-185 g/eq (ASTM D-1652); Viscosity (25° C.): 7.0-10.0 Pa · s (ASTM D-445)) (epoxy resin A) | D.E.R. ®330 (Olin) |
| BPADGE2 | Liquid bisphenol A diglycidyl ether (EEW: 182-192 g/eq (ASTM D-1652); Viscosity (25° C.): 11.0-14.0 Pa · s (ASTM D-445)) (epoxy resin A) | D.E.R. ®331 (Olin) |
| BPFDGE | Liquid bisphenol F diglycidyl ether (EEW: 167-174 g/eq (ASTM D-1652); Viscosity (25° C.): 3.4-4.2 Pa · s (ASTM D-445)) (epoxy resin A) | D.E.R. ®354 (Olin) |
| Araldite DY-D | Diglycidylether of butanediol (epoxy-functional reactive diluent RD) | Araldite ® DY-D (Huntsman) |
| Ancamine K54 | 2, 4, 6-tris(dimethylaminomethyl) phenol (Lewis base LB) | Ancamine ® K54 (Evonik) |
| Jeffamine T-403 | Trifunctional polyether amine having primary amino groups (n = 3, $R^1$ = poly(oxypropylene), $R^2$ = methyl) (amino-functional hardener B) | Jeffamine ® T-403 (Huntsman) |
| Jeffamine D-205 | Difunctional polyether amine having primary amino groups (n = 2, $R^1$ = poly(oxypropylene), $R^2$ = ethyl) (amino-functional hardener B) | Jeffamine ® D-205 (Huntsman) |
| EHA | 2-Ethyl hexanoic acid (carboxylic acid AC) | (Sigma Aldrich) |
| VAA | n-Valeric acid (carboxylic acid AC) | (Sigma Aldrich) |
| MBA | 2-Methylbutyric acid (carboxylic acid AC) | (Sigma Aldrich) |
| INA | Isononanoic acid (carboxylic acid AC) | (Sigma Aldrich) |
| OLA | Oleic acid (carboxylic acid AC) | (Sigma Aldrich) |

For testing, either the individual components K1 and K2 were tested directly (viscosity) or a homogenous mixture of each respective component K1 and K2 in each example two-component composition was prepared using a stirrer and the respective testing protocol (see above) was employed.

Test data is shown for each composition in Tables 3, 5, and 7.

TABLE 2

Details of compositions C1 to C3.

| | C1 | C2 (Ref.) | C3 (Ref.) |
|---|---|---|---|
| Component K1 | | | |
| BPADGE1 | 81.5 | — | — |
| BPADGE2 | — | 100.0 | 70.0 |
| BPFDGE | 5.0 | — | 30.0 |
| Araldite DY-D | 14.0 | — | — |
| TOTAL Component K2 | 100 | 100 | 100 |
| Ancamine K54 | 20.0 | — | — |
| Jeffamine T-403 | — | — | 100.0 |
| Jeffamine D-205 | 60.0 | 100.0 | — |
| EHA | 20.0 | — | — |
| TOTAL | 100 | 100 | 100 |
| Mixing ratio (K1:K2) (weight/weight) | 100:10 | 100:30 | 100:46 |
| Index (amine/epoxy) | n/a | 0.98 | 1.06 |

TABLE 3

Test data of compositions C1 to C3.

| Test data | C1 | C2 (Ref.) | C3 (Ref.) |
|---|---|---|---|
| Viscosity component K1 (mPa · s) | 1300 | 13000 | 8500 |
| Viscosity component K2 (mPa · s) | 90 | 29 | 118 |
| Mix viscosity (K1 + K2) initially at 23° C.(mPa · s) | 850 | 500 | 1200 |
| Mix viscosity (K1 + K2) after 1 day at 23° C. (Pa · s) | 200 | Gelled after 15 h * | Gelled after 10 h* |
| Mix viscosity (K1 + K2) after 7 days at 5° C. (Pa · s) | 90 | Gelled after 6 days * | Gelled after 4 days * |
| Gel time at 50° C. (h) | 4.2 | 4.1 | 2.8 |
| Gel time at 80° C. (min) | 33 | 38 | 21 |
| $T_g$ full cure onset/midpoint (° C.) | 92/94 | 82/85 | 84/86 |
| Heat deflection temperature (° C.) | 84 | 80 | 78 |
| Fulfillment of ISO 11296-4:2018 table 2 requirement | Yes | Yes | Yes |
| Flexural modulus of elasticity (MPa) | 3000 | 3000 | 3200 |

TABLE 3-continued

Test data of compositions C1 to C3.

| Test data | C1 | C2 (Ref.) | C3 (Ref.) |
|---|---|---|---|
| Flexural strength (MPa) | 112 | 110 | 106 |
| Elongation at flexural strength (%) | 6.7 | 6.1 | n/m |
| Tensile modulus (MPa) | 3300 | 3400 | 3800 |
| Tensile strength (MPa) | 57 | 69 | 64 |
| Elongation at break (%) | 3.8 | 7.9 | 8.5 |

*viscosity increased and reached gel point within the test procedure time.

TABLE 4

Details of compositions C4 to C8.

|  | C4 | C5 | C6 | C7 | C8 |
|---|---|---|---|---|---|
| Component K1 |  |  |  |  |  |
| BPADGE1 | 81.5 | 81.5 | 81.5 | 81.5 | 81.5 |
| BPFDGE | 5.0 | 5.0 | 5.0 | 5.0 | 5.0 |
| Araldite DY-D | 14.0 | 14.0 | 14.0 | 14.0 | 14.0 |
| TOTAL | 100 | 100 | 100 | 100 | 100 |
| Component K2 |  |  |  |  |  |
| Ancamine K54 | 18.2 | 19.8 | 19.8 | 17.9 | 14.6 |
| Jeffamine D-205 | 54.5 | 59.4 | 59.4 | 53.6 | 43.8 |
| EHA | 27.3 | — | — | — | — |
| VAA | — | 20.8 | — | — | — |
| MBA | — | — | 20.8 | — | — |
| INA | — | — | — | 28.6 | — |
| OLA | — | — | — | — | 41.6 |
| TOTAL | 100 | 100 | 100 | 100 | 100 |
| Mixing ratio (K1:K2) |  |  |  |  |  |
| (weight/weight) | 100:11 | 100:10.1 | 100:10.1 | 100:11.2 | 11:13.7 |

TABLE 5

Test data of compositions C4 to C8.

| Test data | C4 | C5 | C6 | C7 | C8 |
|---|---|---|---|---|---|
| Viscosity component K1 (mPa · s) | 1300 | 1300 | 1300 | 1300 | 1300 |
| Viscosity component K2 (mPa · s) | 200 | n/m | n/m | 200 | 147 |
| Mix viscosity (23° C.) (K1 + K2) initially at 23° C. (Pa · s) | 1.0 | 1.1 | 1.1 | 1.0 | 1.2 |
| Mix viscosity (23° C.) (K1 + K2) after 1 day at 23° C. (Pa · s) | 130 | 146 | 142 | 104 | 60 |
| Mix viscosity (23° C.) (K1 + K2) after 2 days at 23° C. (Pa · s) | 1600 | 700 | 850 | 1000 | 150 |
| Mix viscosity (50° C.) (K1 + K2) after 1 day at 23° C. (Pa · s) | 6 | n/m | n/m | 6 | 3 |
| Mix viscosity (23° C.) (K1 + K2) after 7 days at 5° C. (Pa · s) | 35 | 33 | 29 | 30 | 38 |
| Mix viscosity (23° C.) (K1 + K2) after 10 days at 5° C. (Pa · s) | 350 | 400 | 380 | 350 | 190 |
| Gel time at 80° C. (min) | 35 | 33 | 29 | 30 | 38 |
| $T_g$ full cure onset/midpoint (° C.) | 88/92 | n/m | n/m | 88/93 | 79/88 |
| Heat deflection temperature (° C.) | 82 | n/m | n/m | 86 | 78 |
| Fulfillment of ISO 11296-4:2018 table 2 requirement | Yes | n/m | n/m | Yes | Yes |
| Flexural modulus of elasticity (MPa) | 2925 | n/m | n/m | 2775 | 2700 |
| Flexural strength (MPa) | 110 | n/m | n/m | 114 | 105 |

"n/m" means "not measured".

The data in Table 5 shows that various acids are suitable as carboxylic acid AC. The compositions in Table 4 were formulated and mixed such that an Index (molar ratio) carboxylic acid groups/tertiary amino groups of about 0.9 resulted in each composition. The shown compositions C4 to C8 are all highly suitable for CIPP processes. The initial mix viscosity was in every case low enough that a liner material can be easily impregnated. Furthermore, the mix viscosity after 1 day was high enough to render the impregnated felt sag-resistant in a CIPP application and finally, the gel time was in each experiment short enough for a fast curing process.

Influence of Amino-Functional Hardener B

A series of experiments C9 to C12 was performed to demonstrate the effect of hardener B according to formula (I), and additionally, the ratio of acid groups of acid AC to tertiary amino groups of Lewis base LB.

The compositions and test results are shown in Tables 6 and 7.

TABLE 6

Details of compositions C9 to C12.

|  | C9 (Ref.) | C10 | C11 (Ref.) | C12 |
|---|---|---|---|---|
| Component K1 |  |  |  |  |
| BPADGE1 | 81.5 | 81.5 | 81.5 | 81.5 |
| BPFDGE | 5.0 | 5.0 | 5.0 | 5.0 |
| Araldite DY-D | 14.0 | 14.0 | 14.0 | 14.0 |
| TOTAL | 100 | 100 | 100 | 100 |
| Component K2 |  |  |  |  |
| Ancamine K54 | 50.0 | 20.0 | 40.0 | 18.2 |
| Jeffamine D-205 | — | 60.0 | — | 54.5 |
| EHA | 50.0 | 20.0 | 60.0 | 27.3 |
| TOTAL | 100 | 100 | 100 | 100 |
| Acid: Tertiary amine (mol/mol) | 0.63 | 0.63 | 0.9 | 0.9 |
| Mixing ratio (K1:K2) |  |  |  |  |
| (weight/weight) | 100:4 | 100:10 | 100:5 | 100:11 |

TABLE 7

Test data of compositions 09 to C12.

| Test data | C9 (Ref.) | C10 | C11 (Ref.) | C12 |
|---|---|---|---|---|
| Viscosity component K1 (mPa · s) | 1500 | 1500 | 1500 | 1500 |
| Viscosity component K2 (mPa · s) | 600 | 100 | 630 | 200 |
| Mix viscosity (23° C.) (K1+ K2) initially at 23° C. (mPa · s) | 1300 | 900 | 1200 | 1000 |
| Mix viscosity (23° C.) (K1 + K2) after 1 day at23° C.(Pa · s) | 14 | 200 | 14 | 130 |
| Mix viscosity (23° C.) (K1 + K2) after 2 days at 23° C. (Pa · s) | >2000 | >2000 | 1350 | 1100 |
| Mix viscosity (50° C.) (K1 + K2) after 1 day at 23° C.(Pa · s) | 1 | 13 | 1 | 6 |
| Mix viscosity (23° C.) (K1 + K2) after 7 days at 5° C. (Pa · s) | 5 | 90 | 4 | 80 |
| Mix viscosity (23° C.) (K1 + K2) after 10 days at 5° C.(Pa · s) | 35 | 800 | 8 | 350 |
| Gel time at 80° C. (min) | 60 | 33 | 58 | 35 |
| $T_g$ full cure onset/midpoint (° C.) | 79/88 | 88/93 | 73/82 | 88/92 |
| Heat deflection temperature (° C.) | 81 | 85 | 76 | 82 |
| Fulfillment of ISO 11296-4:2018 table 2 requirement | Yes | Yes | Yes | Yes |
| Flexural modulus of elasticity (MPa) | 2970 | 2780 | 3070 | 2925 |
| Flexural strength (MPa) | 117 | 117 | 118 | 110 |

Table 7 shows that the addition of relatively small amounts of hardener B (in every experiment 6 weight parts per 100 weight parts resin component) in connection with the Lewis salt obtained from acid AC and Lewis base LB, already leads to an improvement of the processability of the composition and thus suitability for CIPP applications. First, the initial viscosity of the mix is at least 30% lower in the composition containing hardener B, which makes impregnation of a felt material easier. Second, the mix viscosity after 1 day at room temperature is significantly higher, with the effect that sagging is avoided when the felt is inserted in a tube during the CIPP process. Third, the gel time is significantly shorter in the inventive examples, thus accelerating the curing step in a CIPP application. Lastly, the mix viscosity of the mixed compositions according to the present invention after 10 days storage at 5° C. is still conform with the CIPP inversion process according to ASTM F1216.

The invention claimed is:

1. A two-component epoxy resin composition, consisting of:
   a resin component K1 comprising:
      between 75 and 95 wt.-%, based on component K1, of at least one epoxy resin A that contains on average more than one epoxy group per molecule;
      between 5 and 25 wt.-%, based on component K1, of at least one epoxy-functional reactive diluent RD having one or two epoxy groups per molecule; and
   a hardener component K2 comprising:
      between 50 and 70 wt.-%, based on component K2, of at least one amino-functional hardener B of formula (I),

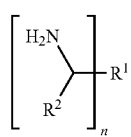

wherein n is an integer with a value of 2 or 3, $R^1$ is a linear, cyclic or branched alkyl residue that optionally contains ether oxygen atoms and $R^2$ is a methyl or ethyl group;
      between 15 and 25 wt.-%, based on component K2, of at least one Lewis base LB that is selected from the group consisting of tris-2,4-6-dimethylaminomethyl phenol, 1,1,3,3-tetramethylguanidine, and 1,8-diazabicyclo [5.4.0] undec-7-ene; and
      between 15 and 25 wt.-%, based on component K2, of at least one carboxylic acid AC,
   wherein the at least one Lewis base LB and the at least one carboxylic acid AC are present together in the form of a Lewis salt, and
   wherein a molar ratio of carboxylic acid groups of the at least one carboxylic acid AC to tertiary amino groups of the at least one Lewis base LB is between 0.6 and 0.95.

2. The two-component epoxy resin composition according to claim 1, wherein the residue $R^1$ is an oligomer or polymer containing oxypropylene repeating units.

3. The two-component epoxy resin composition according to claim 1, wherein the hardener B has an amine hydrogen equivalent weight of between 50 and 100 g/eq.

4. The two-component epoxy resin composition according to claim 1, wherein carboxylic acid AC is a linear or branched C2 to C18 monocarboxylic acid.

5. The two-component epoxy resin composition according to claim 1, wherein epoxy resin A comprises liquid bisphenol A diglycidyl ethers and optionally liquid bisphenol F diglycidyl ethers with a viscosity at 25° C., measured according to ASTM D-445, in the range of 8 to 12 Pa·s.

6. The two-component epoxy resin composition according to claim 1, wherein reactive diluent RD comprises linear or branched C12 to C14 monoglycidyl ethers and/or linear or branched C2 to C6 diglycidyl ethers.

7. The two-component epoxy resin composition according to claim 1, wherein the two-component epoxy resin composition contains the reactive diluent RD with an amount of between 10 and 20 wt.-%, based on resin component K1.

8. A process for relining a pipe, comprising the steps:
   1) preparing a two-component epoxy resin composition according to claim 1;
   2) mixing the two-component epoxy resin composition;
   3) impregnating a relining felt material with the mixed epoxy resin composition;
   4) applying the epoxy-resin impregnated relining felt material in a cured-in-place pipe rehabilitation (CIPP) process.

9. The process according to claim 8, wherein the relining felt material is a polyester felt, a glass-fiber reinforced polyester felt, or a glass fiber felt.

10. The process according to claim 8, wherein between step 3) and step 4) the impregnated felt material is stored up to at least one week at a storage temperature of between −15° C. and 25° C., before step 4) is applied.

11. The process according to claim 8, wherein step 3) is not performed at the same place than step 4).

12. The process according to claim 8, wherein the mixed epoxy resin material with which the felt material is impregnated is cured during the CIPP process by steam or hot water.

13. A felt material impregnated with a mixed two-component epoxy resin composition according to claim 1.

14. A pipe, relined using the process according to claim 8.

15. The two-component epoxy resin composition according to claim 1, wherein the molar ratio of carboxylic acid groups of the carboxylic acid AC to tertiary amino groups of the Lewis Base LB in the composition is between 0.5 and 1.0.

16. The two-component epoxy resin composition according to claim 1, wherein the molar ratio of carboxylic acid groups of the carboxylic acid AC to tertiary amino groups of the Lewis Base LB in the composition is between 0.6 and 0.95.

* * * * *